March 1, 1966  R. G. ROHRBERG ETAL  3,238,347
WELDING APPARATUS
Filed Oct. 26, 1964
5 Sheets-Sheet 2

INVENTORS
RODERICK G. ROHRBERG
EARL STANLEY ARMITAGE
BY
Charles F. Dischler
ATTORNEY

United States Patent Office 3,238,347
Patented Mar. 1, 1966

3,238,347
WELDING APPARATUS
Roderick G. Rohrberg, Inglewood, and Earl Stanley Armitage, Redondo Beach, Calif., assignors to North American Aviation, Inc.
Filed Oct. 26, 1964, Ser. No. 408,457
25 Claims. (Cl. 219—60)

This application is a continuation-in-part of prior copending application Serial No. 402,521, filed October 8, 1964, now abandoned.

This invention relates to an improved apparatus for applying heat along an arcuate path on a workpiece such as to accomplish welding thereon. More particularly, the invention contemplates improved means for fusion welding along a circular path such as necessary to form permanent connections between abutting ends of two adjacent conduit sections by compact, portable and lightweight apparatus such as required for in-place welding of small workpieces in crowded installations.

Although the apparatus disclosed herein may be used for many different types of joints or connections, it will be illustratively described in connection with joinder of elongate tubes or conduits. It will be understood that the scope of the inventive concept is not limited by the specific details used to explain the invention, except as determined by reference to the accompanying claims.

Where welded conduit unions are used to join two fluid conduits to form a strong-lightweight and leakproof joint therebetween, bench welding of such unions permits the welding to be done by any of several known commercially available welding devices. However, where the available working space around the precise location of the weld is severely limited, and the conduit joint is relatively inaccessible, the apparatus for accomplishing such welding must be relatively small in size and extremely compact. Moreover, where small or thin-walled tubing is involved in welded unions of the stated type, precision welding is often necessary, with a high degree of accuracy in regard to electrode clearance, travel rate and welding current application.

Accordingly, it is a principal object of the invention in this case to provide improved means for precision welding of generally cylindrical workpiece portions such as conduits or the like to each other at the adjoining ends thereof.

It is a further object in this case to provide apparatus capable of use in crowded equipment areas involving severely limited working space around the workpiece location.

It is a further object of this invention to provide apparatus as set forth in the above objects including means for observing the location of the welding electrode relative to the workpiece and permitting accurate adjustment of the electrode clearance prior to the welding operation, while the workpiece is secured within the apparatus.

It is a further object in this case to provide improved electrode mounting means permitting quick, easy and accurate adjustment of an electrode arc gap or welding clearance.

Other objects and advantages of the instant invention will become apparent upon a close reading of the following detailed description of an illustrative embodiment of the invention, reference being had to the accompanying drawings, wherein.

Figures 1, 2:
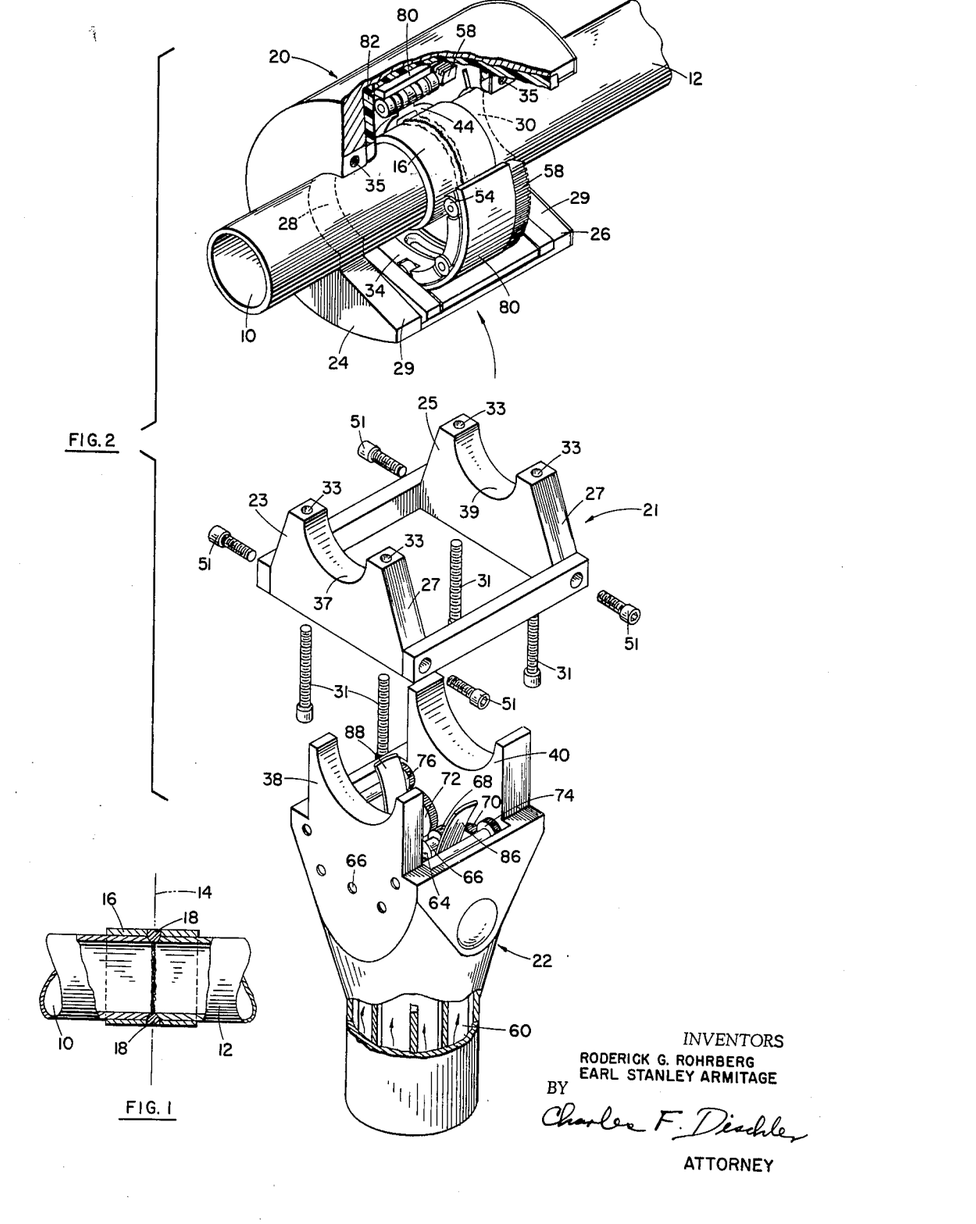
FIG. 1 shows a type of conduit connection adapted to be welded by the novel apparatus disclosed herein.
FIG. 2 shows an exploded view in perspective of an illustrative embodiment of the apparatus disclosed herein.

Referring to the drawings described briefly above and particularly to FIG. 1, the novel apparatus in this case is especially suitable in forming joints or unions between a pair of thin-walled conduits 10 and 12 which may be axially aligned with their ends in substantially uniform contact along a plane of abutment 14. A metallic sleeve 16 may advantageously be situated around the stated conduit ends with plane 14 substantially centered between the two ends of the sleeve. The weld nugget shown in cross-section and indicated by reference numeral 18 in FIG. 1 fuses the material in sleeve 16 and conduits 10 and 12 to form the completed joint. Other workpiece shapes or types of joint may be welded with the apparatus disclosed herein, and its use in making the joint shown by FIG. 1 is merely illustrative.

Referring to FIG. 2, it may be seen that the novel apparatus disclosed herein and adapted to apply welding heat to form weld nugget 18 in the joint shown by FIG. 1 generally comprises three housing portions 20, 21 and 22. Portions 20 and 21 may broadly be described as workpiece housing portions, while portion 22 is an electrical power and mechanical drive connection housing portion. Portion 20, which substantially surrounds the workpiece in generally concentric relationship during the welding operation as shown in FIG. 2, for example, comprises a generally cylindrical chamber having substantially semi-quadrant portion omitted therefrom, the omitted segment resulting in a space or gap through which the workpiece is adapted to pass and into which housing portion 21 is adapted to fit in a manner described more particularly hereinbelow. Chamber 20 includes means for supporting the workpiece in operative relationship for welding, such means comprising a pair of end portions 24 and 26, each having an opening therein adapted to surround and contact the conduits as indicated by bearing surfaces 28 and 30, respectively, shown in FIG. 2. Workpiece housing portion 21 is provided with end portions 23 and 25 having sloping sides indicated by reference numeral 27 adapted to contact surfaces 29 of oppositely corresponding slope on chamber 20 in mating relationship therewith. A plurality of screws 31 is provided to pass through holes 33 in portion 21 and to threadably engage holes 35 in portion 20 for holding the two stated housing portions together after their initial assembly around workpiece components 10 and 12 in the manner discussed below. With portions 20 and 21 assembled together in operative relationship for welding, surfaces 37 and 39 of end portions 23 and 25, respectively, bear against conduits 10 and 12, holding the same in stationary relationship against bearing surfaces 28 and 30 on chamber 20. After assembly of portions 20 and 21 together in the stated manner, housing portion 22 is assembled to portions 20 and 21 by plugging upstanding flange portions 38 and 40 into the space between end portions 23 and 25 of housing portion 21. Flange portions 38 and 40 are sized and spaced apart as necessary to provide a close sliding fit within housing portion 21, and screws 51 may be tightened to hold or clamp together housing portions 21 and 22. Thus, housing portion 21 functions as an adaptor permitting suitable power and mechanical drive connections in portion 22 and described more particularly hereinbelow to be operatively engaged with functionally related components within chamber 20.

It is a particularly significant feature of the inventive apparatus disclosed herein that chamber 20 receives and supports the workpiece elements in the precise operative relationship required for the welding operation, and incorporates an access opening permitting both direct visual observation and manual access to the workpiece and the welding electrode while thus supported. It is a further significant feature of the inventive concept disclosed herein that the stated operative relationship, after appropriate adjustment within chamber 20, is effectively and securely maintained by attachment of adapter 21 to chamber 20, and that housing portion 22, with power cable and drive connections therein, is selectively detachable in operative relationship with chamber 20 by means of adapter 21.

Figures 7, 8, 10:
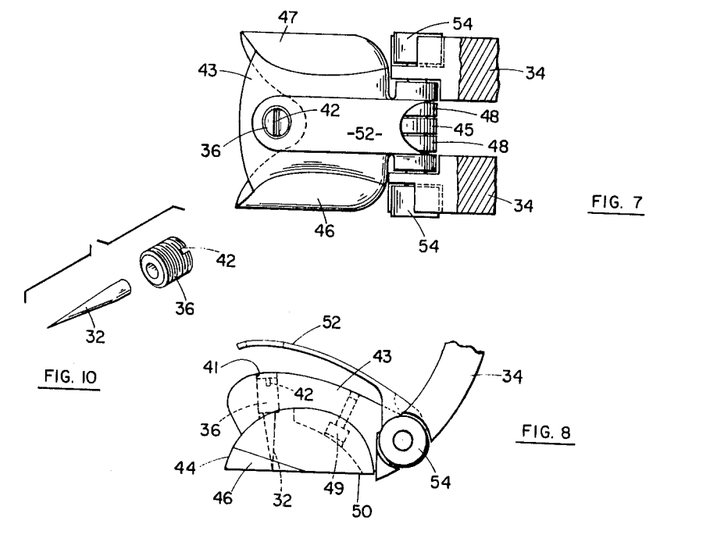
FIGS. 7, 8 and 9 show isolated views, partly broken away, of the electrode mounting details from the apparatus shown in FIGS. 2, 3, 4, 5 and 6.
FIG. 10 shows an isolated exploded view in perspective of an electrode mounting detail from the structure shown in FIGS. 7, 8 and 9.

Welding is accomplished within chamber 20 by a suitable source of welding heat which, in the embodiment shown by FIGS. 2–10, comprises elongate tungsten electrode 32 adapted to travel in a generally arcuate or circular path, the center of which lies in plane 14 (FIG. 1) and substantially on the axial centerline of conduits 10 and 12. Electrode 32 is supported in a mounting ring 34 by means permitting adjustable variation of the welding arc clearance, or the distance between the distal end of electrode 32 and the workpiece surface to which welding heat is applied. As seen more particularly from FIGS. 7, 8 and 10, for example, the stated means comprise rotatable base means 36 to which electrode 32 is affixed. Base means 36 comprises a setscrew adapted to fit closely within a hole 41 (FIG. 8) radially extending through a metallic member 43 described more particularly below, and to be threadably engaged therewith by a helical thread whereby rotation of base 36 causes electrode 32 to move either toward or away from the workpiece, depending upon the direction of rotation of base means 36 during preliminary adjustment of the electrode prior to the welding operation. Referring to FIG. 10, it will be understood that electrode 32 is substantially cylindrical at its supported end, thus corresponding in shape with the hole in base member 36 adapted to receive and support the electrode. It is an important feature of the invention in the instant case that items 32 and 36 are sized to permit a forced fit between the same, whereby the electrode, for all practical purposes, is permanently affixed to base member 36 in fixed unitary relationship during the life of the electrode, after which the stated parts may be separated by a simple bench operation and a new electrode may be mounted in the same base. It may further be seen from FIGS. 7 and 10 that base means 36 is provided with an elongate cavity or slot 42 on the end thereof opposite from the electrode 32 to permit operative engagement of a screw driver, for example, to rotate base means 36 during preliminary electrode clearance adjustment. Alternatively, cavity 42 may be hexagonal or otherwise shaped to receive an Allen wrench or the like. It will also be understood that base 36 is sized to fit closely within hole 41 so that, in the absence of substantial rotational force applied to base 36, no relative movement between hole 41 and base 36 can occur.

Figure 3:
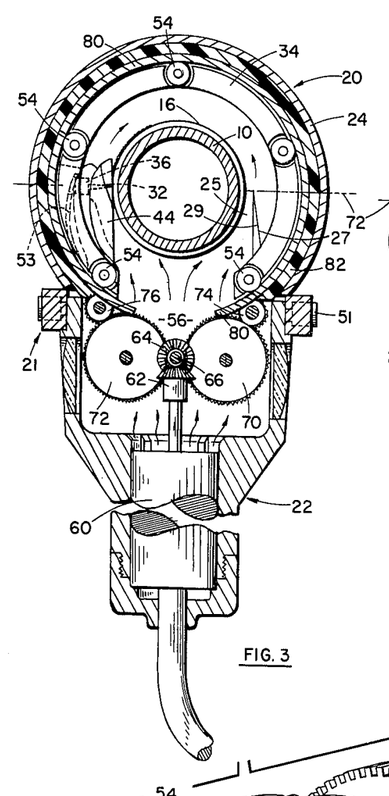
FIG. 3 shows a cross-sectional view taken through the apparatus of FIG. 2 in the assembled state and operatively related with the same workpiece.
Figure 9:
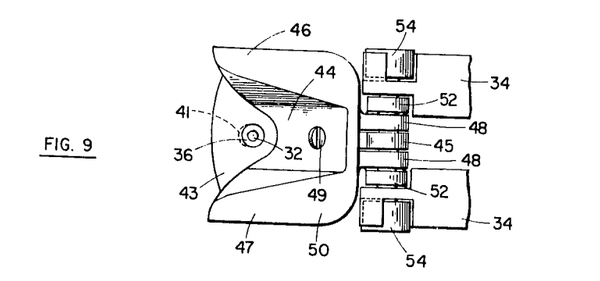

It may be seen from FIG. 9, for example, that metallic member 43 is provided with pivotal support means 45 at one end thereof for pivotally mounting member 43 on ring 34. Guide means 44 are structurally related to member 43 to maintain the electrode clearance substantially constant during the entire path of movement of electrode 32 during the welding operation. Guide means 44 comprises a generally U-shaped sliding cam member provided with a pair of spaced-apart projections 46 and 47 between which electrode 32 is substantially centered with the parts assembled in operative relationship as seen in FIG. 9, for example. Pivot means 48 are provided on guide means 44 as shown in FIG. 9 for pivotally mounting guide means 44 on ring 34, and a holding screw 49 secures together items 43 and 44 in substantially constant mutual relationship in the assembled state. Guide means 44 is provided with a bearing or cam surface 50 on each of the spaced-apart projections 46 and 47 which are adapted to contact the outer peripheral surface of the workpiece on either side of the location where welding heat is applied, and to be maintained in substantially continuous contact therewith by the biasing force of a leaf spring 52. Leaf spring 52 is pivotally mounted at one end thereof by two bosses or lugs on a common pivot axis with items 43 and 44 as described above, while the free end of the spring bears against metallic member 43 when the welding tool is operatively related to a workpiece as shown by FIG. 3.

As further seen from FIGS. 2, 3, 4 and 5, mounting ring 34 is supported within housing 20 by a plurality of rollers 54 which permit rotational movement of mounting ring 34 relative to stationary housing portions 20 and 21. Moreover, it may be seen that mounting ring 34 does not form a complete circle, but has a substantial portion removed therefrom, forming a peripheral gap 56 (FIG. 3) which is adapted to function in a manner described in greater detail below.

Figure 4:
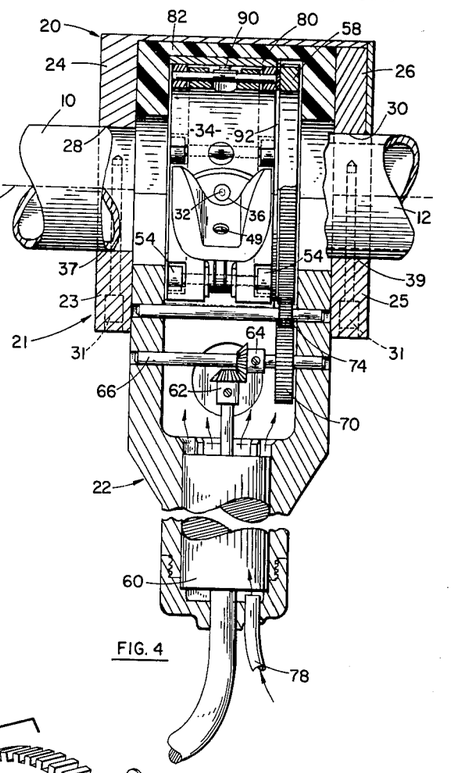
FIG. 4 shows another cross-sectional view through the same apparatus shown in FIGS. 2 and 3, along a plane 90° from the cross-sectional plane of FIG. 3.
Figure 5:
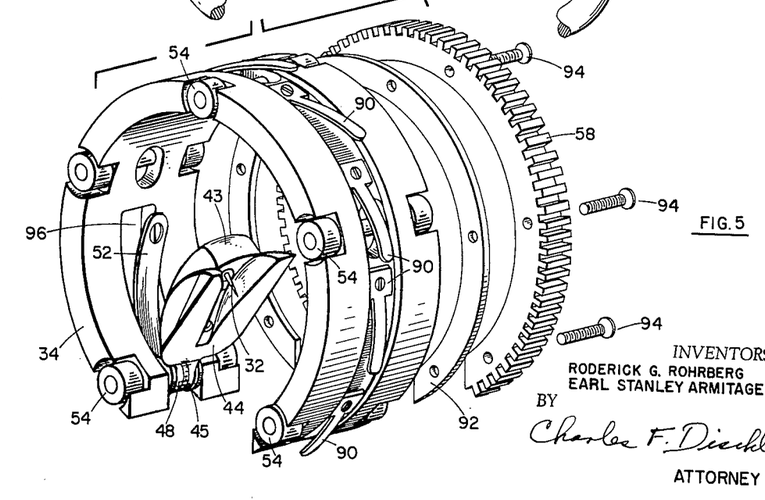
FIG. 5 shows an isolated view in perspective of an internal component from the apparatus shown in FIGS. 2, 3 and 4.
Figure 6:
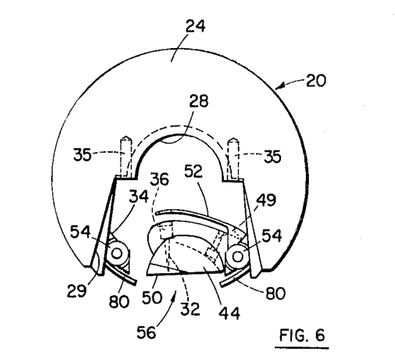
FIG. 6 shows an isolated view of the electrode mounting details comprising a portion of the component shown in FIG. 5.

Referring to FIGS. 2 and 5, it may further be seen that mounting ring 34 within housing portion 20 is provided with a ring gear 58 by means of which ring 34 may be rotated within the housing. The stated rotation is caused by driving means including a drive motor 60 (FIGS. 3 and 4) adapted to rotate a bevel gear 62 operatively engaging another bevel gear 64 affixed to a common shaft 66 with a pinion 68 (FIG. 2). Pinion 68 in turn is adapted to drive a plurality of additional pinions 70, 72, 74 and 76 as seen from FIGS. 2 and 3, for example. Referring specifically to FIG. 3, it may be seen that rotation of ring 34 is caused by driving engagement of one or both pinions 74 and 76, and that gap 56, being less in width than the distance between pinions 74 and 76, results in at least one of the driving pinions being engaged with gear 58 at all times during rotation of the ring.

Referring to FIG. 4, it may be seen that housing portions 20, 21 and 22, when operatively assembled about a workpiece or a plurality of workpiece elements, form a substantially closed chamber about the parts to be welded. Suitable means for conducting inert gas to provide a non-oxidizing atmosphere within such chamber may be incorporated in the welding apparatus disclosed herein. Thus, for example, gas inlet connection 78 may be provided as seen in FIG. 4 to flood the interior of housing portions 20, 21 and 22 with inert gas continuously during the welding operation. Grooves or spaces around drive motor 60 may be provided as generally suggested in FIG. 2, for example, to permit the passage of inert gas from inlet 78 past the motor.

Figure 2A:
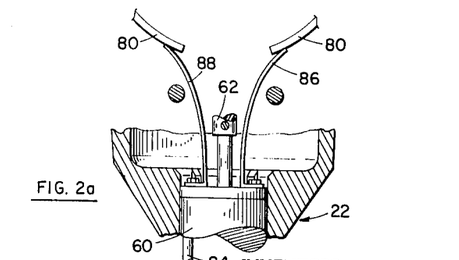
FIG. 2a shows an isolated view, partly broken away, of the electrical connections within the apparatus shown by FIGS. 2, 3 and 4, with portions of structure omitted for the sake of clarity.

Means are also provided in the welding tool disclosed herein for supplying electrical power to electrode 32 continuously and safely during welding. From FIGS. 2a, 3 and 4, it may be seen that the stated means include relatively thin arcuate electrically conductive insert 80 affixed within housing portion 20 and electrically insulated therefrom by a dielectric mass 82. Insert 80 may illustratively be made of copper. Electrical power from a suitable external source (not shown) may be supplied to insert 80 through a suitable electrical connection to a pair of metallic wipers 86 and 88 shown particularly in FIG. 2a which are adapted and positioned to contact the opposite ends of arcuate copper insert 80 on either side of gap 56 when housing portions 20, 21 and 22 are assembled together in operative relationship. Electrical power thus supplied to insert 80 through wipers 86 and 88 thereafter passes into electrically conductive ring 34 through a plurality of resilient spring contacts 90 shown particularly in FIG. 5, some of which continuously bear against the inner surface of insert 80 during rotation of rotatable ring 34 relative to stationary housing portion 20 and insert 80 which is affixed therein. Welding power is thus supplied to metallic member 43 through its pivotal connection 45 with ring 34, and thence to electrode 32 mounted therein. Except for guide means 44, which is electrically non-conducting, all of the electrically conductive parts of ring 34 are spaced apart from the workpiece components, although the distal end of electrode 32 is sufficiently close to the welding area whereby a welding arc may be established when the workpiece is connected in circuit. It will further be understood from the description set forth hereinabove that electrically conductive ring 34 is isolated from the surrounding structure comprising housing portions 20, 21 and 22 by suitable insulating means primarily comprising dielectric mass 82. Also, dielectric gasket 92 separates gear 58 from the remaining portions of ring 34, and the stated components are held in operative relationship by suitable means which may take the form of dielectric screws 94, for example, all as shown more particularly in FIG. 5.

*Operation*

Although the apparatus disclosed herein and discussed above may be used for the application of heat to a variety of diverse materials, workpieces, and for different purposes, its operation need not in any case differ materially from that described below for the sake of illustration. Prior to use of the apparatus for welding, the workpiece components to which heat is to be applied must first be positioned in the desired final relationship. Where the workpiece components are of elongate or tubular type such as conduit sections 10 and 12, the conduits are aligned in abutting relationship about a common longitudinal axis, with sleeve 16 centered over the plane of abutment 14 as shown, for example, in FIG. 1.

With the workpiece components thus arranged, housing portion 20 may be positioned in operative relationship therewith by passing the assembled workpiece components through the side opening of the housing and through gap 56 in ring 34. It will be understood that the size of mounting ring 34 and the distance or span across gap 56 will be determined by the size of the conduits or other workpiece components required to be contained within the apparatus disclosed herein and to pass through the stated gap.

After the assembled workpiece components are positioned within housing portion 20 in the manner generally shown by FIG. 2, and before assembly of housing portions 21 and 22 therewith, rotation of welding ring 34 by force manually applied thereto may be accomplished to rotate the welding ring relative to housing portion 20 so that the welding electrode clearance between electrode 32 and the outer surface of sleeve 16 may be visually observed and accurately measured by feeler gages or the like. Also, accurate centering of the workpiece components axially may be achieved with respect to electrode 32 by manual alignment of the workpiece components within housing portion 20 during direct visual observation of the electrode and sleeve 16, for example. When adjustment of the arc gap is necessary, ring 34 may be manually rotated to permit access of a screwdriver to slot 42 in electrode base 36 through hole 96 in welding ring 34 shown in FIG. 5, for example, and through an access hole in spring 52 shown in the same figure. Through a process of alternate measurement and adjustment of the arc gap in the stated manner, a very accurate and precise positioning of electrode 32 may be accomplished in the welding apparatus disclosed herein.

After positioning housing portion 20 and mounting ring 34 in the manner described above, and establishing the corrcet welding clearance or arc gap between electrode 32 and the workpiece area to which welding heat is applied, housing portion 21 may be positioned in operative relationship with housing portion 20 whereby surfaces 27 and 29 are in firm and substantially uniform mutual contact, and bearing surfaces 37 and 39 on portion 21 contact conduits 10 and 12, respectively, in the areas aligned with surfaces 28 and 30 of portion 20 shown in FIG. 2. Thereafter, holding screws 31 are rotated within holes 33 and 35 to secure together housing portions 20 and 21 in relatively fixed mutual relationship during the welding operation. After housing portions 20 and 21 are secured together in the foregoing manner, housing portion 22, to which necessary power cable or gas connections are secured, may be positioned in operative relationship with housing portions 20 and 21 by insertion of upstanding flanges 38 and 40 between end portions 23 and 25 of housing portion 21. Positioning of housing portion 22 also includes careful interengagement of pinions 74 and 76 with ring gear 58 in driving relationship therewith, and proper contact of wipers 86 and 88 with arcuate insert 80. Thereafter, if firm contact between housing portions 21 and 22 is not already established by cooperative sizing of the contacting surfaces therebetween, holding screws 51 mounted on housing portion 21 as indicated in FIG. 2, for example, may be tightened to clamp housing portion 22 securely in the stated operative relationship with housing portions 20 and 21.

Upon completion of the assembly procedures described above, appropriate electrical and inert gas connections from external sources (not shown) may be made with the welding fixture and with the workpiece grounded, and a flow of inert gas through inlet connection 78 may precede the actual flow of welding current through wipers 86 and 88 whereby oxidation and other adverse effects on the workpiece components which might otherwise occur in the heated state are avoided. Flow of inerting gas is continuously maintained throughout the welding operation, and covers the welding area by passing through various openings or holes around welding ring 34 as may be seen more particularly from FIGS. 4 and 5. Since the inerting agent may be at a relatively low temperature, the stated procedure provides the additional advantage of cooling the workpiece components in the areas thereof adjacent to the location where welding heat is applied, thus helping to avoid widespread annealing of the workpiece material.

Welding is accomplished in the welding fixture described above by application of electrical power to electrode 32 during simultaneous rotation of welding ring 34. The stated rotation is caused by constant speed electric motor 60 acting trough bevel gears 62 and 64, and pinions 70–76. Following completion of the welding operation, holding bolts 51 and 31 may be loosened and housing portions 20, 21 and 22 may be separated from around the workpiece components and removed therefrom.

Figure 11:
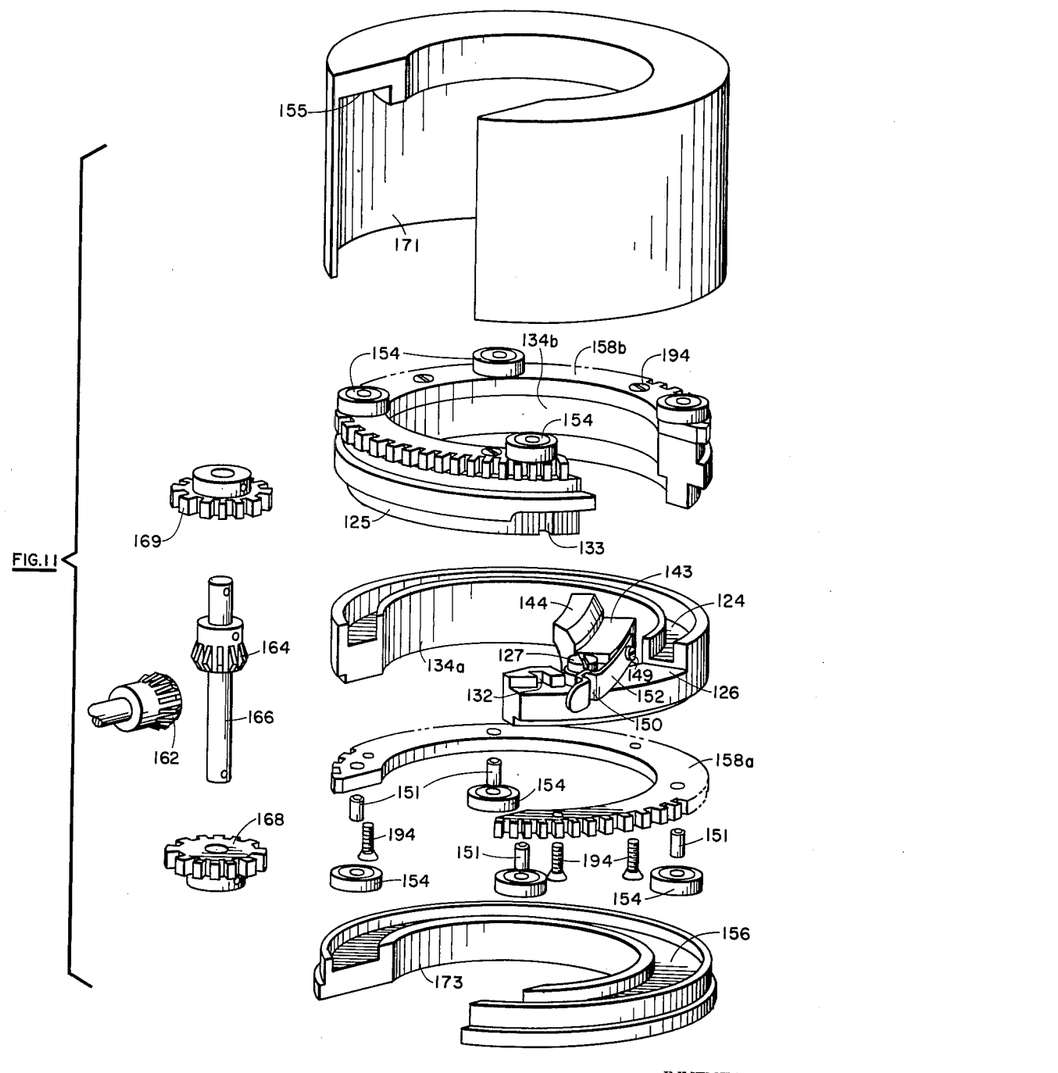
FIG. 11 is an exploded perspective view of the operative elements of a second embodiment of the present invention.
Figure 12:
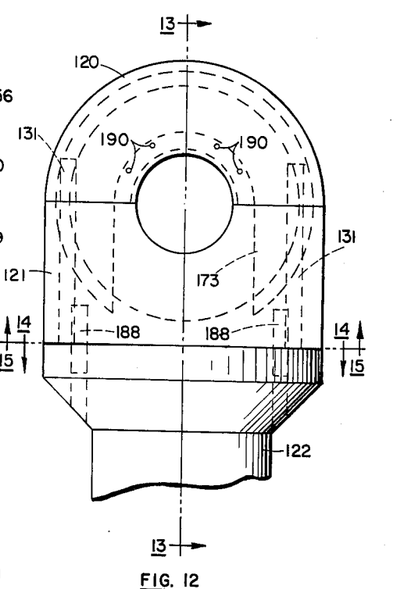
FIG. 12 is a side elevational view of such second embodiment shown without conduits therein.
Figure 13:
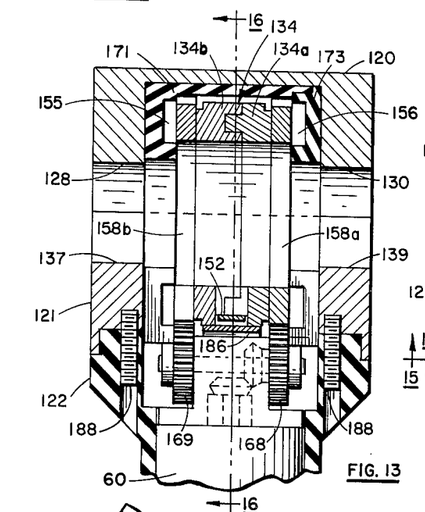
FIG. 13 is a transverse sectional view taken in the plane of line 13—13 in FIG. 12.
Figure 14:
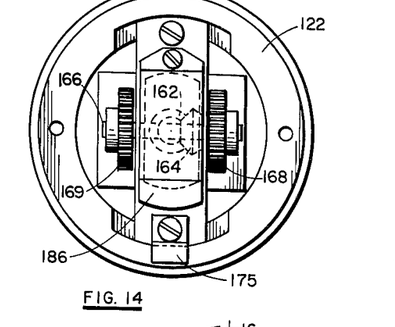
FIG. 14 is a top plan view of the lower housing portion of the embodiment of FIG. 12 as viewed in a disassembled condition in the plane of line 14—14 in FIG. 12.
Figure 15:
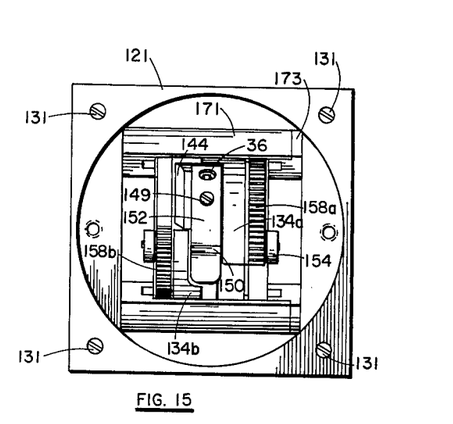
FIG. 15 is a bottom plan view of the two upper housing portions of the embodiment of FIG. 12 as viewed in a disassembled condition in the plane of line 15—15 in FIG. 12.

A second somewhat simplified embodiment of the present invention is disclosed in FIGS. 11 through 16. As best seen in FIGS. 12 and 13, this embodiment comprises workpiece housing portions 120 and 121 which are generally hemi-cylindical in configuration and are adapted to be joined together by means of bolts 131 to fully encircle the conduits 10 and 12 and sleeve 16 of FIG. 1 and form a welding chamber thereabout. For this purpose housing portions 120 and 121 have hemi-cylindrical bearing surfaces 128, 130 and 137, 139, respectively, for closely surrounding and contacting the conduits to clamp the joined housing portions securely to such conduits.

Figure 16:
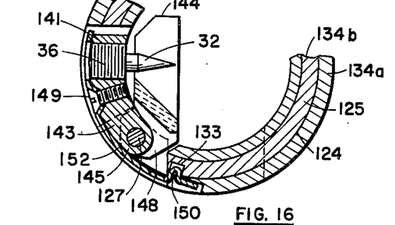
FIG. 16 is a fragmentary view of the electrode mounting structure of the second embodiment.

Referring to FIGS. 11 and 16, electrode 32 is supported in a composite mounting ring 134 in a manner similar to that previously described. Specifically, the electrode is mounted in base means 36 which is threaded into threaded aperture 141 formed near the outer end of a metallic member 143. By threading the base means 36 into or out of aperture 141, the requisite arc clearance between the surface of the tubing and the electrode tip is obtained.

Member 143 is provided with pivotal support means 145 at its inner end for pivotally mounting member 143 on ring 134. An insulating guide means or shoe 144 having an inverted cup-like or U-shaped bottom surface and a pivot means 148 for attachment to ring 134 is positioned beneath member 143 so that the legs or spaced apart side projections thereof act as cams riding over the conduit surface to automatically maintain the proper arc length after adjustment of electrode base means 36. Leaf spring 152 is secured to the upper surface of member 143 by a fastening means 149 and provides the biasing force for maintaining the electrode assembly described above in its proper relationship to the conduit. The inner end of the spring includes a U-shaped corrugation 150 which forms a detent means for fixedly securing the inner end of the spring and also for providing a latching means for composite mounting ring 134 as will now be described.

Ring 134 is comprised of two electrically conductive metallic rings 134a and 134b, each of which has a segmental or semi-quadrant portion omitted therefrom whereby the rings may be slipped over the conduits and sleeve. Ring 134a has an annular channel 124 formed on its inner radial face, while ring 134b has a complementary annular projection 125 for insertion into channel 124 whereby a composite ring 134 may be formed wherein the two ring elements may be rotated with respect to each other about their common axis. Annular channel 124 on ring 134a does not extend over the full annular extent of the ring so that a reduced cross section 126 is formed at one end of the ring to pivotally mount electrode holding member 143 and insulating guide means 144 on a common pivot pin 127.

A notched detent 132 for reception of U-shaped corrugation 150 of spring 152 is formed near the end of ring section 126. A similar notched detent 133 is formed on the opposite end of ring 134b. Thus, for emplacing a conduit in the device, rings 134a and 134b are turned to align their segmental openings and permit their being slipped over the conduit. Thereafter, one of the rings is rotated until the notched detents 132 and 133 are in alignment. Spring corrugation 150 is then snapped into these detents and the ring members are effectively locked against further rotational movement. With the ring gaps no longer in alignment, the conduit is now effectively fully enclosed by the electrically conductive composite mounting ring 134.

To drive the welding electrode and the mounting ring structure around the conduit, segmental ring gears 158a and 158b are secured to rings 134a and 134b, respectively, as by screw means 194 with the segmental gaps of each respective ring and gear in fixed alignment. To facilitate rotation of mounting ring 134, a plurality of rollers 154 are mounted on pins 151 on the outer face of each ring gear adapted to roll in annular grooves 155 and 156 which are formed in an electrically insulating dielectric body adapted to surround the rotating electrode structure described above. This dielectric body is comprised of generally hemi-cylindrical member 171 and end closure member 173 which are adapted to be pressed together and seated in housing portions 120 and 121 to surround and encompass electrode mounting ring 134 and ring gears 158.

Ring gears 158 are driven from motor 60 through a simplified gear train consisting of a bevel gear 162 which operatively engages bevel gear 164 affixed to shaft 166. Pinion gears 168 and 169 are affixed to the outer ends of shaft 166 to engage and drive ring gears 158a and 158b, respectively. It will be apparent that with mounting rings 134a and 134b in operative welding position, i.e., with their gaps out of alignment, the gaps of ring gears 158a and 158b are also non-aligned. This means that at least one of pinion gears 168 or 169 is always meshed with and driving its associated ring gear.

As in the previous embodiment suitable means may be incorporated for conducting inert gas into the welding chamber to provide a non-oxidizing atmosphere therein. For this purpose housing portion 120 contains a number of small apertures 190 to permit exit of purge gas from the welding chamber.

Electrical power for welding is supplied to electrically conductive ring 134 from a suitable external source (not shown) by metallic wiper contact 186 which is adapted to contact and rub against ring 134 as it is rotated by the drive mechanism. Such power is then transmitted from ring 134 across the pivotal joint 127, through metallic member 143 and thence through electrode base means 36 and electrode 32 to the workpiece. The welding circuit is completed from the conduit through bearing surfaces 128, 130, 137 and 139. Metallic housing portion 121 is grounded by contact with ground connection 175 in housing portion 122.

Thus, it will be seen that while this second embodiment differs in certain details from the first described embodiment it operates in essentially the same manner with the clearance between electrode 32 and the outer surface of sleeve 16 or whatever tubular surface is being welded being susceptible of visual observation and accurate measurement by a feeler gauge prior to rotation of mounting rings 134a and 134b to their non-aligned position wherein they are locked by spring corrugation detent 150. Adjustment of the arc gap may be made as already disclosed with respect to the first described embodiment. Similarly, after proper positioning of housing portion 120, composite mounting ring 134, ring gears 158 and dielectric members 171 and 173 with respect to the conduits 10 and 12 and metallic sleeve 16 housing portions 120 and 121 are securely joined in fixed relationship to clamp the conduits between the hemi-cylindrical end bearing surfaces. Lower housing portion 122 containing motor 60 and having power cable and purging gas connections thereto is then secured to housing portion 121 by threaded fastening means 188. Housing 122 is preferably of a dielectric material and serves as a handle for conveniently manipulating the assembled welder.

From the description of the above embodiments and their mode of operation as set forth above and shown in the drawings, it may be seen that the invention disclosed herein provides novel means for applying heat such as required for welding operation in remote and in accessible areas. The welding apparatus, being extremely efficient and compact, is readily adaptable for welding a variety of different workpiece shapes and sizes, such as elbows, T's crosses, reducers and the like. The feature which permits separation of the housing portions and assembly thereof about an immovable and relatively inaccessible workpiece adapts the apparatus for in-place welding of fluid lines, tubes and conduits, thus avoiding the necessity for disassembly and removing portions of structure from an aircraft, missile or other vehicle interior as required for bench welding in a workshop. Thus, heat is concentrated at the precise location where welding is accomplished, and the compact apparatus requires only a small space envelope whereby other lines and structural elements situated close to the welding area are not affected by welding heat.

Among the several advantages provided by the apparatus disclosed herein, one of the most significant derives from the overall relationship between the electrode mounting means within the welding chamber and the chamber construction which permits external access to electrode 32 as necessary to measure and to vary the arcing distance thereof while the workpiece is supported within the chamber. Thus, workpiece components 10, 12 and 16 may first be positioned within the welding chamber, as shown by FIGS. 2, 3 and 4, for example, in precisely the same operative relationship necessary for welding during the subsequent application of welding heat. While thus supported in the welding chamber, the welding clearance or arc gap between electrode 32 and sleeve 16 may be directly viewed, accurately measured, and easily adjusted, whereby nothing is left to chance and the welding parameters applicable to each specific workpiece size, material or configuration may be controlled with extreme accuracy without any particular operative skill by those using the apparatus.

It is a further and very significant feature of the concept disclosed herein that adjustability of the arc gap is made possible by the detailed mounting arrangement for electrode 32. Thus, the use of threaded base or set screw 36 for mounting elongate pencil-type electrode 32 permits easy, rapid, and accurate adjustability of the arc gap, constituting a significant detail which is usable in many other and very different types of welding apparatus in addition to that disclosed herein. Moreover, a considerable economic advantage is achieved by the use of set screw 36 for mounting electrode 32 in view of the ease and rapidity of manufacture possible for threaded cylindrical members, and a substantial saving of space is further achieved by such mounting means at no loss of functional effectiveness.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

We claim:

1. In apparatus for progressively applying heat for welding a generally cylindrical workpiece portion along an arcuate welding path:
   chamber means including a substantially cylindrical chamber for supporting said workpiece substantially concentrically therewithin,
   an electrode for applying said heat,
   means mounting said electrode in said chamber for arcuate movement of said electrode relative to said chamber and in spaced relationship with said workpiece portion,
   said electrode mounting means including adjustably movable means for varying said space between said electrode and said workpiece portion, and
   said chamber having access opening means for external access as required to move said adjustably movable means and to measure said space while said workpiece is supported within said chamber.

2. The structure set forth in claim 1 above, wherein:
   said adjustably movable means includes threaded set screw means rotatably mounted within said chamber whereby rotation of said set screw means may be accomplished to remove said set screw means from said chamber, and
   said electrode is affixed to said set screw means and movable therewith.

3. In apparatus for progressively applying heat for welding a generally cylindrical workpiece portion along an arcuate welding path:
   chamber means including a substantially cylindrical chamber for supporting said workpiece substantially concentrically therein,
   an electrode for applying said heat by an electrical arc,
   said chamber having access opening means for external access as required to move said electrode and measure the arcing distance of said arc while said workpiece is supported in said chamber.

4. The structure set forth in claim 3 above, including:
   adjustably movable means for mounting said electrode within said chamber to permit adjustable variation of said arcing distance of said arc.

5. The structure set forth in claim 3 above, including:
   means for mounting said electrode within said chamber,
   said means for mounting said electrode including guide means for maintaining substantially constant said adjusted arcing distance continuously during welding along said arcuate path.

6. The structure set forth in claim 5 above, wherein:
   said guide means comprises a dielectric cam pivotally mounted above a pivot axis and
   spring means biasing said cam into contacting relationship with said workpiece for continuous contact therewith during welding along said arcuate path.

7. The structure set forth in claim 5 above, wherein:
   said adjustably movable means comprises a set screw translationally movable by rotation of said set screw, and said electrode is affixed to said set screw.

8. In apparatus for progressively applying heat for welding a generally cylindrical workpiece portion along an arcuate welding path:
   chamber means including a substantially cylindrical chamber for supporting said workpiece substantially concentrically therein,
   an electrode for applying said heat by an electrical arc,
   means for mounting said electrode within said chamber for arcuate movement of said electrode relative to said workpiece,
   said chamber having access opening means for external access as required to measure the arcing distance of said arc,
   adapter means releasably attachable to said chamber means for securing said workpiece therein in operative relationship for application of said heat during said welding, and
   drive means releasably attachable to said adapter means and operatively interengageable with said means for mounting said electrode to cause said arcuate movement.

9. The structure set forth in claim 8 above, wherein:
   said adapter means includes means for receiving a releasably engageable cable end connection for supplying welding power and mechanical driving movement means for said welding operation.

10. Electrode mounting means for an elongate welding electrode, consisting of:
    a helically threaded, substantially cylindrical, electrically conductive base,
    and means for securely joining together in fixed unitary relationship said electrode and said base.

11. The structure set forth in claim 10 above, wherein:
    said base is provided with cavity means for application of torque to rotate said base, and
    said means for joining said electrode to said base comprises an opening in said base adapted to receive an end of said electrode in forced fitting relationship.

12. Means for mounting an elongate, generally cylindrical electrode, consisting of:
- a generally cylindrical metallic base having helical threads externally thereon, and
- a hole concentrically situated through said base and adapted to receive an end of said elongate electrode and to support said electrode in permanently fixed relationship with said base, said base being adapted to transmit electrical welding power to said electrode.

13. In apparatus for progressively applying heat for welding a generally cylindrical workpiece portion along an arcuate welding path:
- chamber means including a substantially cylindrical chamber for supporting said workpiece substantially concentrically therewithin,
- an electrode for applying said heat,
- said chamber having access opening means for external access as required to move said electrode and measure the arcing distance of said arc,
- means for movably mounting said electrode within said chamber,
- said means for movably mounting said electrode comprising a generally cylindrical electrically conductive base having a helical thread provided thereon, said electrode being affixed to said base, and
- mounting means for mounting said base for rotational movement of said base relative to said mounting means whereby rotation of said base causes translational movement of said base along an axis coinciding with the center of said rotation.

14. The structure set forth in claim 13 above, including:
- means for mounting said electrode base comprising a ring having a substantially semi-quadrant portion of its periphery omitted to form a peripheral gap in said ring, said gap having a dimensional span sufficient to admit said workpiece into said ring through said gap.

15. The structure set forth in claim 14 above, including:
- gear means including a ring gear affixed to said ring and having a substantially semi-quadrant portion omitted from said ring gear to form a gap in said ring gear substantially coinciding in dimensional span with said gap in said ring.

16. The structure set forth in claim 15 above, including in addition thereto:
- drive means operatively connected to said ring gear to cause rotation of said ring gear and said ring during application of said heat,
- said drive means comprising a plurality of spaced-apart pinions, each rotatably journaled on a separate axis, said axes being substantially parallel to each other and spaced apart by a distance greater than said dimensional span of said gap, whereby, during rotation of said ring gear, when one of said pinions becomes disengaged from said ring gear at one end of said gap, at least one other of said pinions remains drivingly engaged with said ring gear and continues said rotation.

17. The structure set forth in claim 15 above, including:
- electrically conductive wiper means on said ring for wiping contact with an arcuate metallic surface to conduct electrical welding power from said surface into said ring, and
- an arcuate metallic surface affixed within said chamber for connection with an electrical power source to supply welding current to said electrode through said wiper means.

18. The structure set forth in claim 17 above, wherein:
- said arcuate metallic surface is generally cylindrical in shape, with substantially a semi-quadrant portion omitted therefrom to form a gap, said gap having a spanwise dimension sufficient to admit said workpiece through said gap, and
- said wiper means includes a plurality of spaced-apart wipers, the distance between some of said spaced-apart wipers being greater than said gap in said arcuate metallic surface.

19. The structure set forth in claim 17 above, further including:
- roller means on said ring for rolling contact with said chamber on an internal surface thereof to permit rotational movement of said ring relative to said chamber.

20. In apparatus for progressively applying heat for welding a generaly cylindrical workpiece portion:
- chamber means including a substantially cylindrical chamber for supporting said workpiece substantially concentrically therein,
- said chamber having a substantially semi-quadrant portion of its periphery omitted to form a peripheral gap is said chamber,
- said gap having a dimensional span sufficient to admit said workpiece portion into said chamber through said gap,
- an electrode for applying said heat to said workpiece portion by an electrical arc, and
- means for mounting said electrode within said chamber for arcuate movement of said electrode, said means for mounting said electrode including adjustably movable means for varying the arcing distance of said arc,
- said means for mounting said electrode being constructed and arranged to permit external access through said gap in said chamber for adjustable movement of said adjustably movable means while said workpiece is supported within said chamber.

21. In appartus for progressively applying heat for welding a generally cylindrical workpiece portion along an arcuate welding path:
- chamber means including a chamber for supporting said workpiece portion therein,
- an electrode for applying heat to said workpiece portion by an electrical arc,
- means mounting said electrode in said chamber for arcuate movement of said electrode relative to said chamber and in spaced relationship with said workpiece,
- said means for mounting said electrode comprising a pair of rings each having a substantially semi-quadrant portion of its periphery omitted to form a peripheral gap in each of said rings, said gap having a dimensional span sufficient to admit said workpiece into each of said rings through said gaps,
- said pair of rings each having an external gear on the outer periphery thereof,
- said pair of rings being releasably joined together in substantially continuous peripheral contact except for said gap in each of said rings,
- said rings being joined together by an annular tongue and groove joint whereby said rings may be rotated relative to each other into a non-aligned position whereby a fully closed ring means is effectively formed, and
- drive means operatively connected to said external gears to cause rotation of said rings relative to said chamber during application of said heat.

22. The structure set forth in claim 21 above, wherein:
- said drive means comprises a pair of spaced-apart rotatable pinions, one of said pinions operatively engaging one of said external ring gears and the other of said pinions operatively engaging the other of said external ring gears.

23. In apparatus for progressively applying welding heat for welding a generally cylindrical workpiece portion along an arcuate welding path:
- chamber means including a chamber for supporting said workpiece portion therewithin,
- an electrode for applying said welding heat,
- ring means for mounting said electrode in said chamber for arcuate movement of said electrode relative to said chamber,
- said ring means including at least two segmented ring gears uniformly spaced apart about their periphery and both centered substantially about a common axis, each of said ring gears having a portion of their periphery omitted to form a gap, said gap having a spanwise dimension sufficient to permit passage of said workpiece portion through said gap,
- said gaps in said two ring gears being misaligned with respect to each other, and
- drive means operatively engaging said ring gears for causing uniform rotation of said ring means uninterruptedly during said arcuate movement.

24. The structure set forth in claim 23 above, wherein:
- said ring means further comprises a pair of electrically conductive segmented rings adapted to contact each other substantially uniformly about their periphery,
- each of said segmented conductive rings having a portion of their periphery omitted to form a gap therein, and
- securing means for securing together said segmented conductive rings and said segmented ring gears.

25. The structure set forth in claim 24 above, wherein:
- said segmented conductive rings include means for supporting said electrode thereon and in continuous electrical contact therewith, and
- said chamber includes electrically conductive wiper means adapted to contact said segmented conductive rings continuously during said rotation to supply welding power to said electrode.

References Cited by the Examiner

UNITED STATES PATENTS

| | | | |
|---|---|---|---|
| 1,701,433 | 4/1929 | Hand | 219—136 |
| 2,721,248 | 10/1955 | Kirhpatric | 219—125 |
| 2,795,689 | 6/1957 | McNutt | 219—125 |
| 3,148,263 | 9/1964 | Jensen | 219—75 |

RICHARD M. WOOD, *Primary Examiner.*